(12) United States Patent
Aslam et al.

(10) Patent No.: US 10,095,654 B2
(45) Date of Patent: *Oct. 9, 2018

(54) MAPPING AND REDUCING

(71) Applicant: International Business Machines Corporation, Armonk, NY (US)

(72) Inventors: Muhammad Sohaib Aslam, Ajax (CA); Tiia J. Salo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/501,339

(22) Filed: Sep. 30, 2014

(65) Prior Publication Data

US 2016/0094630 A1    Mar. 31, 2016

(51) Int. Cl.
*H04L 29/08* (2006.01)
*G06F 15/167* (2006.01)

(52) U.S. Cl.
CPC ........ *G06F 15/167* (2013.01); *H04L 67/1097* (2013.01); *H04L 67/2833* (2013.01)

(58) Field of Classification Search
CPC . G06F 15/167; G06F 15/176; H04L 67/1097; H04L 67/2833
See application file for complete search history.

(56) References Cited

U.S. PATENT DOCUMENTS

| 8,555,265 B2 * | 10/2013 | Chambers ............... G06F 9/445 717/119 |
| 9,389,995 B2 * | 7/2016 | Hu .......................... G06F 12/00 |
| 2006/0013251 A1 * | 1/2006 | Hufferd ............... H04L 67/1097 370/466 |
| 2013/0253888 A1 * | 9/2013 | Yang ...................... G06F 17/18 703/2 |

(Continued)

FOREIGN PATENT DOCUMENTS

WO    WO 2011/120791    * 10/2011

OTHER PUBLICATIONS

Aslam et al., "Mapping and Reducing", U.S. Appl. No. 14/819,575, filed Aug. 6, 2015, pp. 1-22.

(Continued)

*Primary Examiner* — Larry Donaghue
(74) *Attorney, Agent, or Firm* — Monchai Chuaychoo

(57) ABSTRACT

As disclosed herein, a system for conducting mapping and reducing operations includes a shared storage subsystem that is connected to one or more mapping servers and one or more reducing servers via a high-speed data link and communication protocol. Each mapping server receives a multitude of data records, aggregates the data records having a particular value, and sorts and stores the resulting aggregated data records on the shared storage subsystem. Each reducing server accesses the shared storage subsystem and accumulates information on the aggregated data records for a particular common value. In many instances, the access (Continued)

rates to the shared storage subsystem achieved by the mapping servers and the reducing servers approach that of accessing a local attached storage device. A computer program product and method corresponding to the system for conducting mapping and reducing operations are also disclosed herein.

13 Claims, 4 Drawing Sheets

(56) References Cited

U.S. PATENT DOCUMENTS

| | | |
|---|---|---|
| 2013/0318269 A1 | 11/2013 | Dalal et al. |
| 2013/0318277 A1* | 11/2013 | Dalal .................. G06F 13/1652 710/308 |
| 2014/0081918 A1 | 3/2014 | Srivas et al. |
| 2014/0123115 A1* | 5/2014 | Peretz ................... G06F 11/362 717/127 |
| 2014/0358869 A1* | 12/2014 | Kim ...................... G06F 9/5066 707/692 |
| 2014/0358977 A1* | 12/2014 | Cramer ............. G06F 17/30203 707/827 |

OTHER PUBLICATIONS

IBM Appendix P, list of IBM patents or patent applications treated as related, Aug. 6, 2015.

Md Wasi-Ur-Rahman et al., "HOMR: a hybrid approach to exploit maximum overlapping in MapReduce over high performance interconnects", ICS '14 Proceedings of the 28th ACM International Conference on Supercomputing, pp. 33-42, The ACM Digital Library,© 2014 ACM, Inc., <http://dl.acm.org/citation.cfm?id=2597684>.

* cited by examiner

MAPPING AND REDUCING

BACKGROUND OF THE INVENTION

The present invention relates generally to the field of data processing, and more particularly to data mapping and reducing systems and methods.

A map and reduce program is composed of a mapping operation that performs filtering and sorting (such as sorting students by first name into queues, one queue for each name) and a reducing operation that performs a summary function (such as counting the number of students in each queue, yielding name frequencies). A mapping and reducing system (also called "infrastructure" or "framework") orchestrates the processing by marshalling the distributed servers, running the various tasks in parallel, managing all communications and data transfers between the various parts of the system, and providing for redundancy and fault tolerance.

SUMMARY

As disclosed herein, a system for conducting mapping and reducing operations includes a shared storage subsystem that is connected to one or more mapping servers and one or more reducing servers via a high-speed data link and communication protocol. Each mapping server receives a multitude of data records, aggregates the data records having a particular value, and sorts and stores the resulting aggregated data records on the shared storage subsystem. Each reducing server accesses the shared storage subsystem and accumulates information on the aggregated data records for a particular common value. In many instances, the access rates to the shared storage subsystem that are achieved by the mapping servers and the reducing servers approach that of accessing a local attached storage device. A computer program product and method corresponding to the system for conducting mapping and reducing operations are also disclosed herein.

DETAILED DESCRIPTION

A system for conducting mapping and reducing operations may leverage a shared storage subsystem via remote direct memory access over high-speed data links. Using a shared storage subsystem and high-speed data links and communication protocols, provides superior performance over prior art solutions which transfer data over a TCP/IP based communications network.

Figure 1:
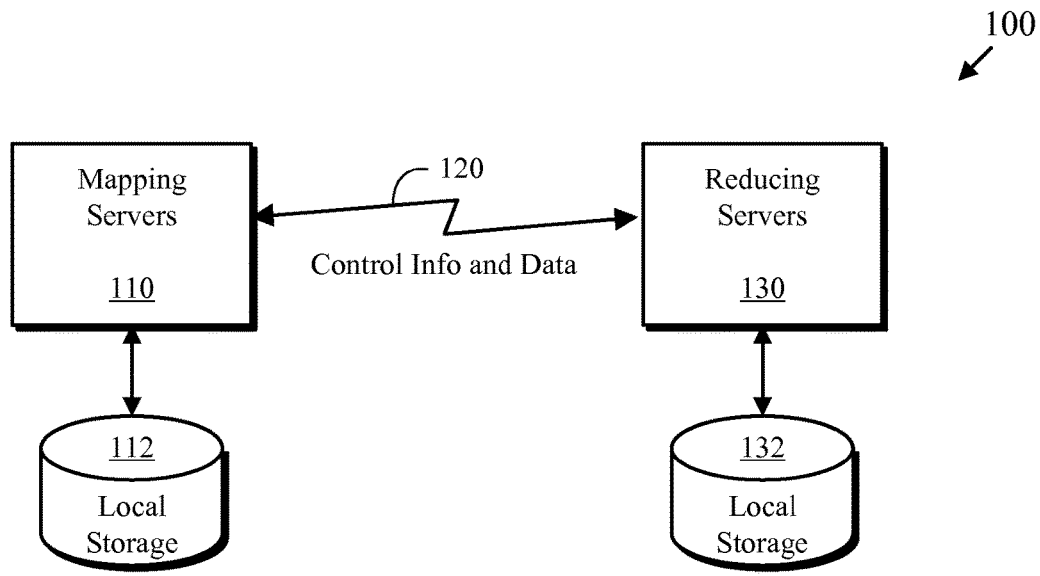
FIG. 1 is a functional block diagram depicting a prior art mapping and reducing system, in accordance with an embodiment of the present invention.

FIG. 1 is a functional block diagram depicting a prior art mapping and reducing system 100. As depicted, the prior art mapping and reducing system 100 includes one or more mapping servers 110, a communication network 120, and one or more reducing servers 130. The prior art mapping and reducing system 100 uses the communication network 120 to transfer control information and data between the mapping servers 110 and the reducing servers 130.

The mapping servers 110 conduct mapping operations on a set of input data records and provide one or more mapped datasets which may be written to a local storage 112 for later retrieval. The communication network 120 is typically a TCP/IP communication network that is leveraged to communicate when the mapping operation for the set of data records has been completed. The communication network 120 may also be used by the reducing servers 130 to request and transfer a selected portion of the mapped data from the mapping servers 110 to a local storage 132 on each of the reducing servers. The transfer of a selected portion of the mapped data to the appropriate reducing server is commonly called a shuffling operation. Each reducing server may conduct reducing operations on the mapped data stored on the local storage 132.

Applicants have observed that using the communication network 120 for the shuffling operation results in high latencies and poor performance. In contrast, the embodiments disclosed herein overcome those issues.

Figure 2:
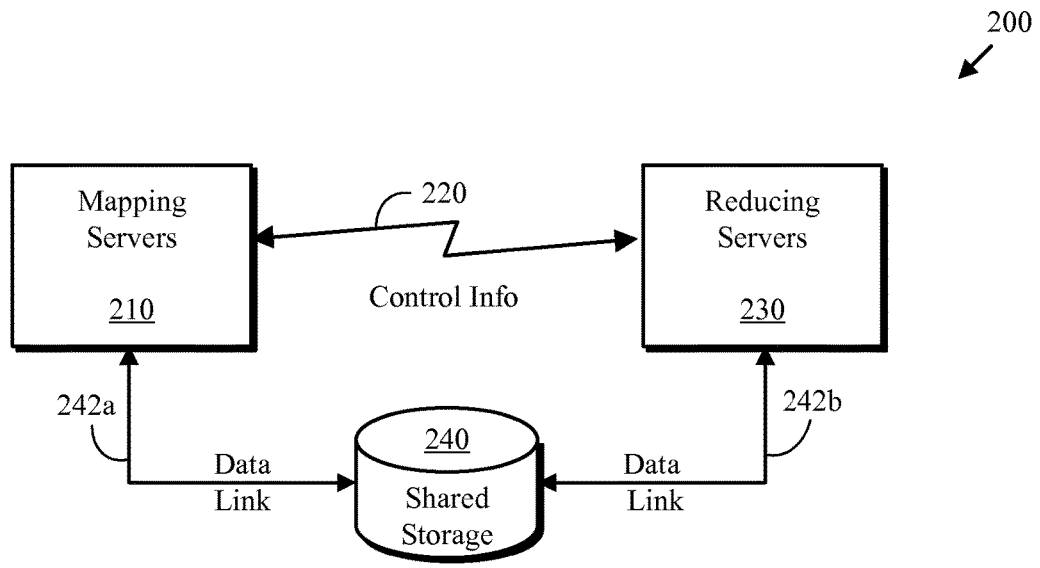
FIG. 2 is a functional block diagram depicting one embodiment of a mapping and reducing system, in accordance with an embodiment of the present invention.

For example, FIG. 2 is a functional block diagram of one embodiment of a mapping and reducing system 200. As depicted, the mapping and reducing system 200 includes one or more mapping servers 210, a control network 220, one or more reducing servers 230, a shared storage subsystem 240, and data links 242 (e.g., data links 242a and 242b). In contrast to the mapping and reducing system 100, the mapping and reducing system 200 employs a shared storage subsystem that substantially eliminates the requirement of transferring data between the mapping servers 210 and the reducing servers 230 over a high latency network such as a TCP/IP network.

Similar to the mapping servers 110, the mapping servers 210 conduct mapping operations on a set of input data records and provide one or more mapped (i.e., aggregated) datasets. However, instead of, or in addition to, writing the mapped datasets to local storage, the mapped datasets are written to the shared storage subsystem 240 via the data link 242a. The control network 220 may subsequently be used to communicate control information such as control messages that indicate when the mapping operations have been completed. Each reducing server 230 may then access the shared storage subsystem 240 via the data link 242b and conduct reducing operations on the mapped data stored on the shared storage subsystem 240.

Figure 3:
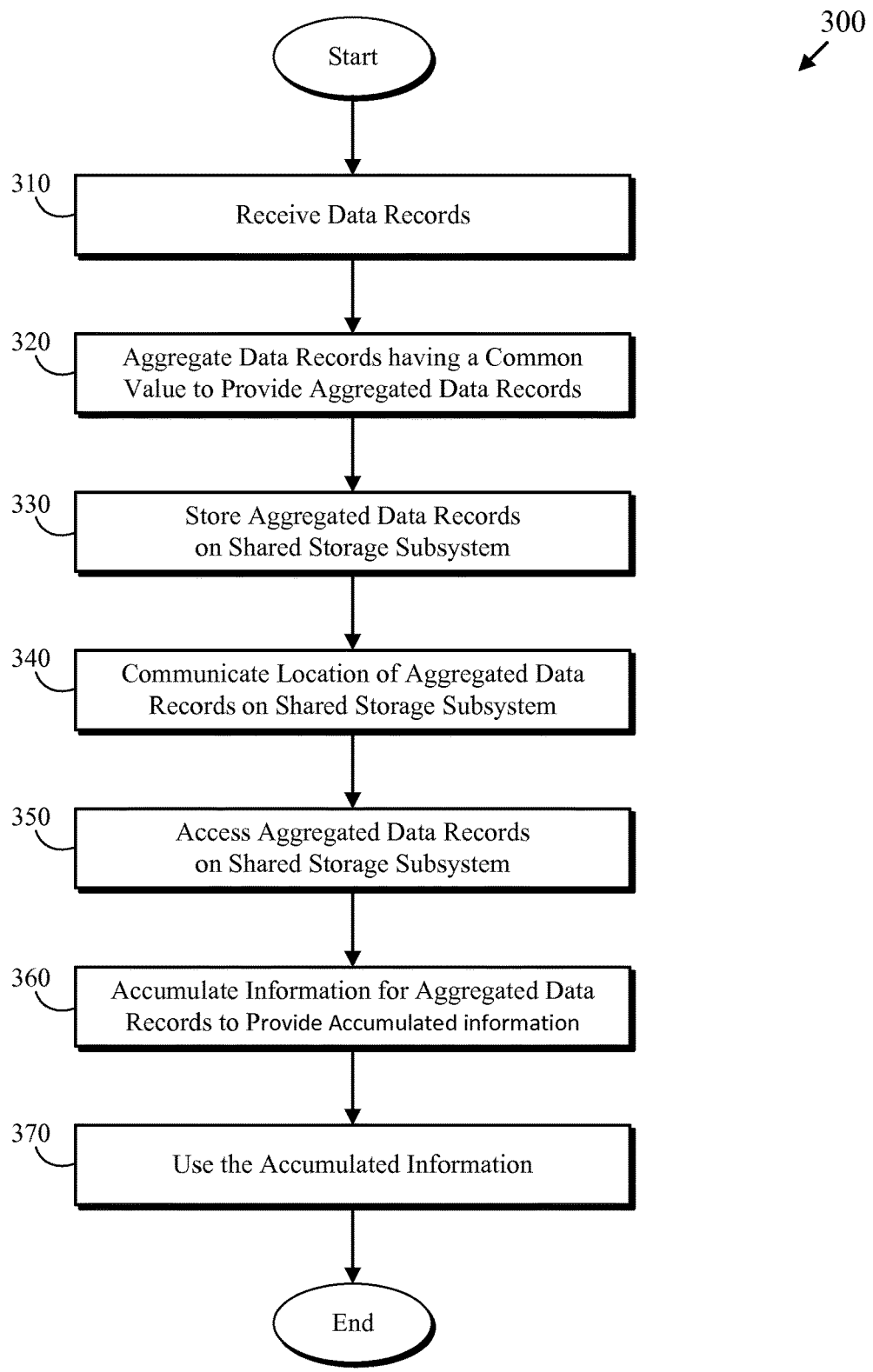
FIG. 3 is a flowchart depicting one embodiment of a map and reduce method, in accordance with an embodiment of the present invention.

FIG. 3 is a flowchart depicting one embodiment of a map and reduce method 300. As depicted, the map and reduce method 300 includes receiving (310) data records, aggregating (320) data records, storing (330) aggregated data records, communicating (340) a location for the aggregated data, accessing (350) aggregated data records, accumulating (360) information for the aggregated data, and using (370) the accumulated information. As depicted, the map and reduce method 300 may be used to process a set of data records and provide accumulated information for the all or part of the set of data records.

Receiving (310) data records may include receiving data records from one or more source. The data could be from a shared memory location, a local storage device, or from an external source that provides the data records over an intranet or internetwork. The data records may be of varying data formats.

Aggregating (320) data records may include parsing through the data records and searching for one or more specific data values. Records having a specific data value may be aggregated into a group corresponding to the specific data value. In one embodiment, the aggregation operation 320 includes collecting data records that include specific information and storing the information as a key/value pair (tuple) in a memory buffer. As an example, a mapper may determine the occurrence of a specific word (such as 'apple') within a data record; the key would be the specific word present in the data record while the value would be the number of occurrences of the specific word in the data record (i.e., ['apple',2]).

The operation of aggregating data may continue until all data records have been processed. Should the memory buffer become full (overflow), the memory buffer may be written (spilled) to an alternate storage location (e.g., local disk or shared memory). Once all data records have been processed, the data records stored in the memory buffer and the alternate storage locations may be sorted and merged to produce one or more sorted collections of aggregated data records.

Storing (330) aggregated data records may include writing the aggregated data records on a shared storage subsystem. In one embodiment, the shared storage subsystem includes a storage device connected to a mapping server via an RDMA data link using the iSER communication protocol. In some embodiments, the aggregated data records are written to the attached shared storage subsystem at rates approaching that of writing the aggregated data records to a locally attached storage device.

Communicating (340) the location of aggregated data may include informing one or more reducing servers of the availability of aggregated data to be processed. The communicating operation 340 may be implemented by the mapping servers as a message to a task tracker. The message indicating the mapping process has completed may contain one or more references to specific locations or regions in the shared storage subsystem. For example, a reference may be a pointer to storage region containing aggregated data records to be processed by one or more reducing servers.

Accessing (350) aggregated data records may include a reducing server requesting the location of aggregated data records to be processed. In one embodiment, the reducing server may receive notification from the task tracker indicating aggregated data is available to be processed. The reducing server may request the location of the aggregated data records from the task tracker. Included in the response from the task tracker may be a storage pointer (filename or handle, and offset) reference indicating the location or storage region of the aggregated data. Using the storage pointer obtained from the task tracker, the aggregated data may be directly accessed by the reducing server without being transmitted over a TCP/IP network and thus substantially eliminate any TCP/IP network latency associated with transferring data.

Accumulating (360) information for the aggregated data may include processing all aggregated data records on the shared storage subsystem that were obtained as a result of accessing the (350) aggregated data records. Once the aggregated data records are processed, the accumulated data may be stored on the shared storage subsystem. In one scenario, the reducer accumulates totals for auto sales in each US city. For example, one reducer may accumulate the number of Chevy Corvettes sold in each city in the US during the month of July in the current year. Another reducer may accumulate the number of Ford Mustangs sold during the month of July in the current year.

Using (370) the accumulated information may include additional processing, such as additional mapping and reducing, generating reports, or other conventional data processing operations. The accumulated data may be stored on the shared storage subsystem for later retrieval, or alternatively, may be passed as input to an upstream application for additional processing.

One of skill in the art will appreciate that the map and reduce method 300 and other embodiments disclosed herein enable the map and reduce operation to access data over a shared storage subsystem using high-speed storage interconnect protocols. Thus, high-speed data transfers replace the traditional file I/O and TCP/IP based data transfer between the output stage of the mapper operation and the input stage of the reducer operation. Consequently, embodiments disclosed herein reduce both CPU overhead and transfer latency, substantially improving the overall mapping and reducing performance.

Figure 4:
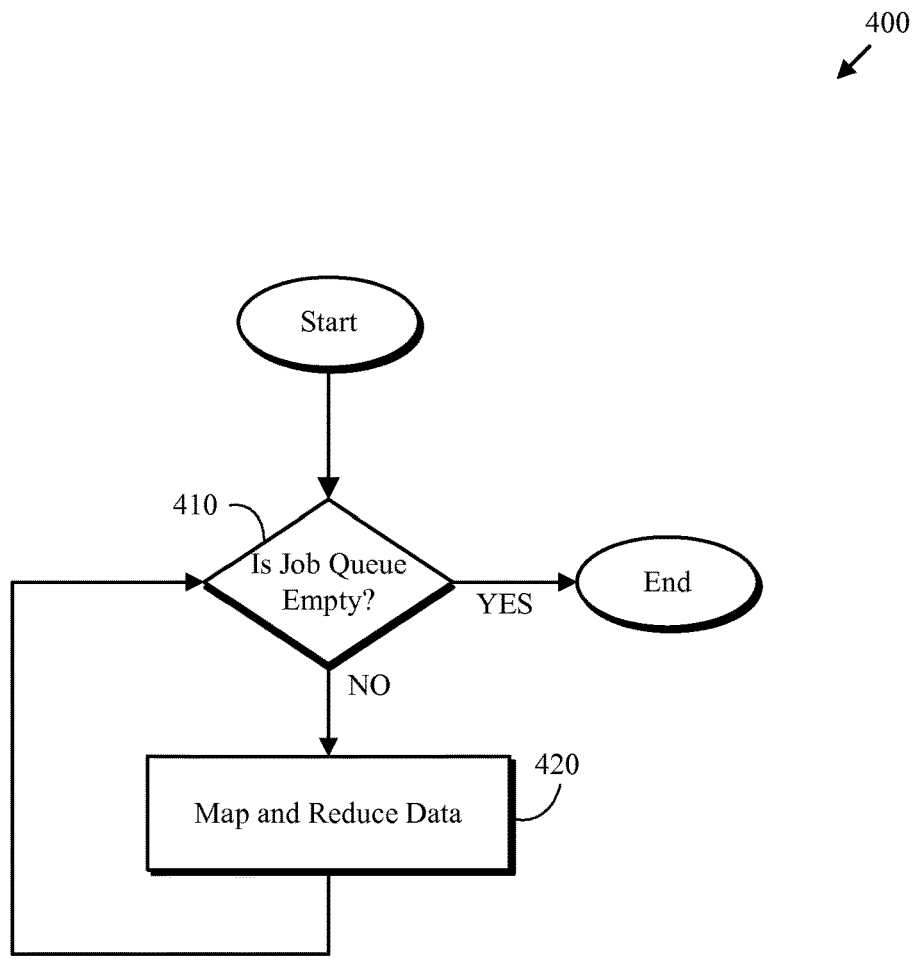
FIG. 4 is a flowchart depicting one embodiment of an iterative map and reduce method, in accordance with an embodiment of the present invention.

FIG. 4 is a flowchart depicting one embodiment of an iterative map and reduce method 400. As depicted, the iterative map and reduce method 400 includes determining (410) whether a job queue is empty and mapping and reducing (420) data. The iterative map and reduce method 400 demonstrates how the output from a map and reduce operation may become the input to a subsequent map and reduce operation.

Determining (410) whether the job queue is empty may include testing a current job queue index or some other procedure well known to those of skill in the art. If the job queue contains additional requests for mapping and reducing, the depicted method 400 proceeds to the mapping and reducing operation 420. Otherwise, the method terminates or is suspended until another job request enters the queue to be processed.

The mapping and reducing operation 420 may be conducted as described in the description of FIG. 3. In the depicted embodiment, the results from one map and reduce operation may become the input for a subsequent map and reduce operation. Consequently, as will be recognized by one of skill in the art, the map and reduce operations of step 420 may, or may not, be pipelined.

Figure 5:
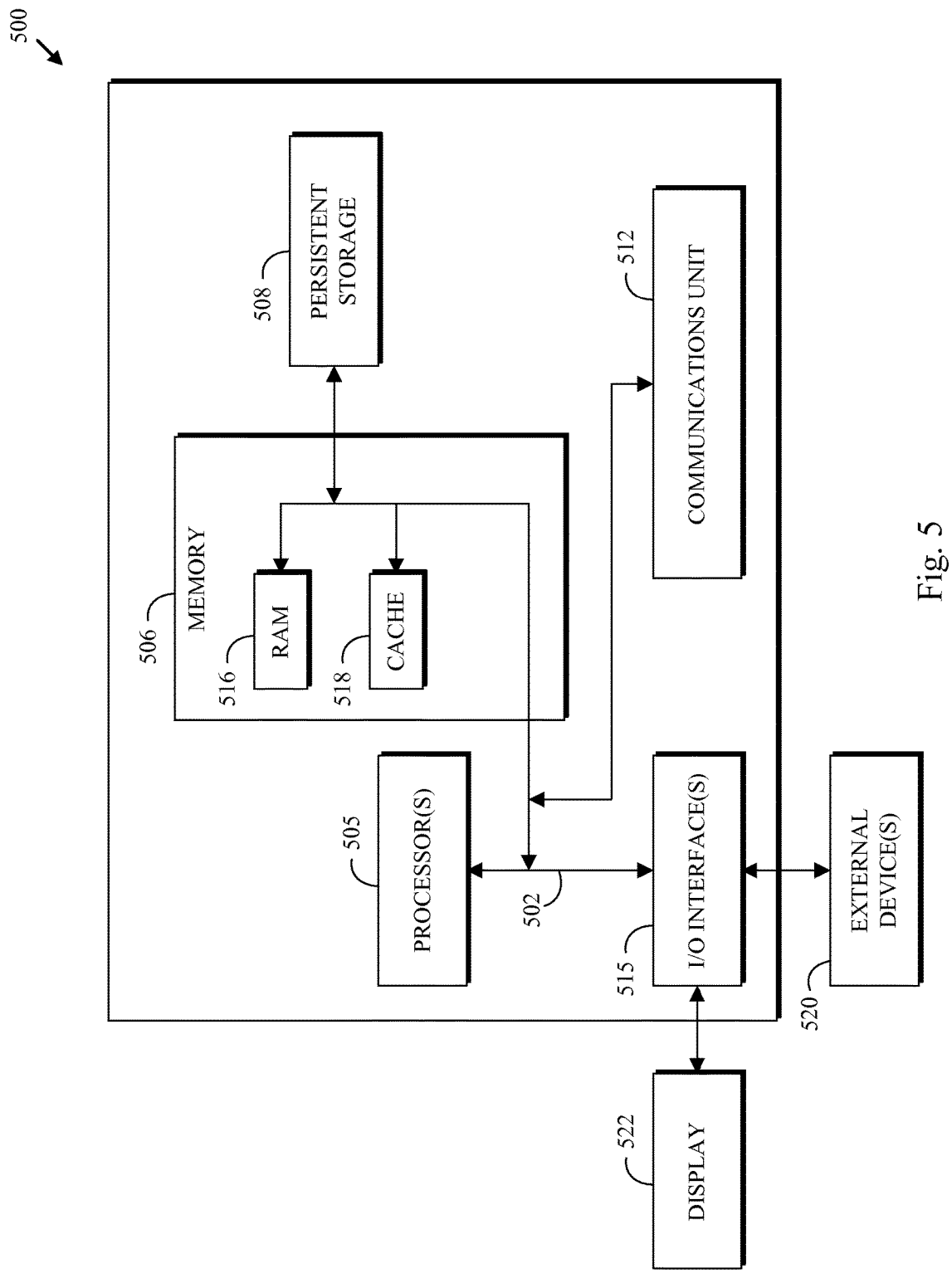
FIG. 5 is a block diagram depicting various components of one embodiment of a computer suitable for executing the methods disclosed herein, in accordance with an embodiment of the present invention.

FIG. 5 is a block diagram depicting various components of a computer 500 suitable for executing the methods disclosed herein. The computer 500 may be one embodiment of the mapping servers 210 and/or the reducing servers 230 depicted in FIG. 2. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices, including mapping servers 210, reducing servers 230, and the shared storage subsystem 240 (see FIG. 2). In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing data communications between servers, the method comprising:
    receiving, by a task tracker, a control information comprising a storage pointer of a location of aggregated data records via a first communication pathway from a first server, wherein the aggregated data records are stored on a shared storage subsystem by the first server via a second communication pathway;
    transmitting, by the task tracker, the storage pointer to a second server via the first communication pathway; and
    transmitting, by the task tracker, a notification to the second server indicating that the aggregated data is ready for use and for the second server to retrieve the data from the shared storage subsystem via the second communication pathway.

2. The method of claim 1, wherein the first communication pathway utilizes TCP/IP (Transport Control Protocol/Internet Protocol).

3. The method of claim 1, wherein the aggregated data records have a common value for a selected field within the data records to provide aggregated data records for each common value.

4. The method of claim 1, wherein the storage pointer further comprises a filename and an offset reference.

5. The method of claim 1, wherein the notification further comprises a control message indicating when the mapping operations have been completed.

6. The method of claim 1, wherein the second communication pathway utilizes iSER (iSCSI Extensions for RDMA) network is a TCP/IP network.

7. The system of claim 1, wherein the first server is a mapping server and the second server is a reducing server.

8. A computer program product for conducting mapping and reducing operations, the computer program product comprising:
    one or more computer readable storage media and program instructions stored on the one or more computer readable storage media, the program instructions comprising instructions to:
    program instructions to receive a control information comprising a storage pointer of a location of aggregated data records via a first communication pathway from a first server, wherein the aggregated data records are stored on a shared storage subsystem by the first server via a second communication pathway;
    transmitting, by the task tracker, the storage pointer to a second server via the first communication pathway; and
    transmitting, by the task tracker, a notification to the second server indicating that the aggregated data is ready for use and for the second server to retrieve the data from the shared storage subsystem via the second communication pathway.

9. The computer program product of claim 8, wherein the instructions further comprise accessing the shared storage subsystem with a storage access protocol the first communication pathway utilizes TCP/IP (Transport Control Protocol/Internet Protocol).

10. The computer program product of claim 8, wherein the aggregated data records have a common value for a selected field within the data records to provide aggregated data records for each common value.

11. The computer program product of claim 8, wherein the storage pointer further comprises a filename and an offset reference.

12. The computer program product of claim 8, wherein the notification further comprises a control message indicating when the mapping operations have been completed.

13. The computer program product of claim 8, wherein the second communication pathway utilizes iSER (iSCSI Extensions for RDMA).

\* \* \* \* \*